US007679788B2

(12) United States Patent
Mak et al.

(10) Patent No.: US 7,679,788 B2
(45) Date of Patent: Mar. 16, 2010

(54) EMBOSSING TOOLS AND TAPE PRINTERS

(75) Inventors: Barry Mak, Wan Chai (CN); Rolance Tse, Tuen Mun (CN)

(73) Assignee: Dymo, N.V., Sint-Niklaas (BE)

( * ) Notice: Subject to any disclaimer, the term of this patent is extended or adjusted under 35 U.S.C. 154(b) by 1577 days.

(21) Appl. No.: 10/487,920

(22) PCT Filed: Aug. 28, 2002

(86) PCT No.: PCT/EP02/09641

§ 371 (c)(1),
(2), (4) Date: Sep. 20, 2004

(87) PCT Pub. No.: WO03/020526

PCT Pub. Date: Mar. 13, 2003

(65) Prior Publication Data

US 2005/0011376 A1 Jan. 20, 2005

(30) Foreign Application Priority Data

Aug. 30, 2001 (GB) ................................ 0121027.7

(51) Int. Cl.

| | |
|---|---|
| ***B41C 1/02*** | (2006.01) |
| ***B41C 1/04*** | (2006.01) |
| ***G06K 15/00*** | (2006.01) |
| ***H04N 1/40*** | (2006.01) |
| ***H04N 1/403*** | (2006.01) |
| *G06F 15/00* | (2006.01) |
| *G06K 1/00* | (2006.01) |

(52) U.S. Cl. .................................... 358/3.31; 358/1.14

(58) Field of Classification Search ................ 358/3.31, 358/1.18, 1.6, 1.2, 1.1, 1.13, 1.14, 1.15
See application file for complete search history.

(56) References Cited

U.S. PATENT DOCUMENTS

| | | | | |
|---|---|---|---|---|
| 3,129,800 | A | 4/1964 | Bogeaus | |
| 5,484,292 | A * | 1/1996 | McTaggart | 434/317 |
| 5,579,692 | A | 12/1996 | Collier | |
| 5,636,565 | A | 6/1997 | Lawrance et al. | |
| 5,983,182 | A | 11/1999 | Moore | |
| 7,264,164 | B2 * | 9/2007 | Sakai et al. | 235/462.01 |

FOREIGN PATENT DOCUMENTS

| | | |
|---|---|---|
| DE | 32 40 386 | 5/1984 |
| GB | 2 141 274 | 12/1984 |
| HU | 190452 B | 9/1986 |
| JP | 2000-163407 | 6/2000 |

OTHER PUBLICATIONS

Patent Abstracts of Japan, vol. 4, No. 127 (P-026) Sep. 1980; and JP 55 080169 (Shibayama Kikai KK) Jun. 1980 (abstract).

* cited by examiner

*Primary Examiner*—Douglas Q Tran
(74) *Attorney, Agent, or Firm*—Marshall, Gerstein & Borun LLP

(57) ABSTRACT

A tape printer for providing an image on a tape medium, the tape printer permitting inputting an image; providing the image on said tape medium; obtaining input image information; and using the input image information to provide an audible output in dependence on the input image.

11 Claims, 5 Drawing Sheets

EMBOSSING TOOLS AND TAPE PRINTERS

The present invention relates to tools such as embossing tools or tape printers.

Known embossing tools are generally hand held and mechanically operated. Embossing tools are designed to emboss selected characters or numbers on an elongated strip of embossable material. This embossable material can be of any suitable construction and may for example be of a thermoplastic resin. The tape is mechanically deformed by squeezing the tape between a die set of a selected character, number or the like. The die set is carried by first and second wheels. The tape passes between the first and second wheels. To emboss an image on the tape, a portion of one of the wheel is urged against the opposite wheel to deform the tape therebetween. The wheels are rotated so that the selected character or like is at the embossing positon.

Tape printing apparatus of the type with which the present invention is generally concerned are disclosed for example in EP-A-322918 and EP-A-322919 (Brother Kogyo Kabushiki Kaisha) and EP-A-0267890 (Variatronics). The printers each include a printing device having a cassette receiving bay for receiving a cassette or tape holding case. The ink ribbon may be included in the same cassette as the image receiving tape or in a different cassette.

In these known tape printing apparatus, an image is input via a keyboard. The image is printed onto the image receiving tape using a thermal printhead. In these known tape printers, the heat from the thermal printhead causes ink from the ink ribbon to be transferred to the image receiving tape. It is also known for an image to be transferred directly to thermally sensitive image receiving tape, without the need for an ink ribbon.

Both of these products can be designed to be relatively small. As the embossers and tape printers are relatively small, it can be difficult to see the numbers or characters of the respective input means. In the case of the tape printer, the input means usually comprises a keyboard or a dial. In the case of an embosser, the input means comprises a rotatable wheel which can be moved. Additionally, visually impaired people can have problems in ascertaining whether or not the right letter or symbol has been printed. A further problem exists when the embosser or tape printer is used by someone who is learning to write. This may be for example a young child or someone learning a new language.

It is the aim of embodiments of the present invention to address one or more of these problems.

According to an aspect of the present invention there is provided a tool for providing an image on a tape medium, said tool comprising means for inputting an image, means for providing said image on said tape medium, means for obtaining input image information from said input means, and sound generation means for using said information to provide an audible output in dependence on said input image.

For a better understanding of the present invention and as to how the same may be carried into effect, reference will now be made by way of example to the accompanying drawings in which.

Figure 1:
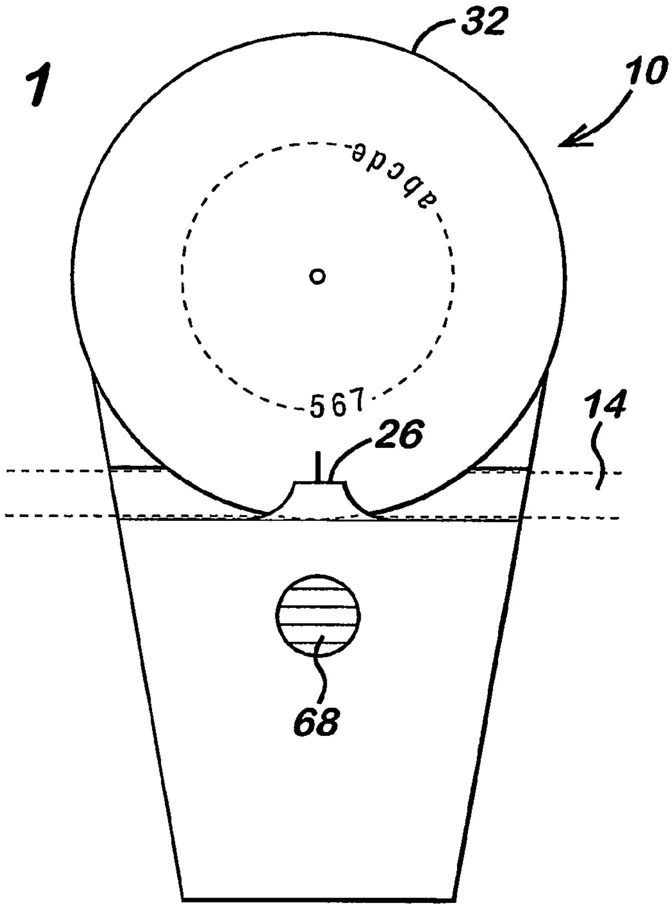
FIG. 1 shows an embosser embodying the present invention.

Reference is made to FIGS. 1 to 4 which show a hand operated embossing tool 10. The tool 10 is designed to emboss selected indicia, such as characters, symbols, numbers or the like, on an elongated strip of embossable material such as a plastic tape 14 or the like. Some embodiments of the present invention are able to deal with more than one width of tape. Other embodiments of the present invention are arranged to deal with a single width of tape. In the embodiment shown in the Figures, precut lengths of tape are inserted into the tool and are embossed. Alternatively or additionally, the embosser can be used with a reel of tape. That reel may be external to the tool or in alternative embodiments of the present invention may be incorporated in the embosser. For example, in some embodiments of the present invention, the tape may be received in the handle of the embosser.

Embossing of the tape is accomplished at an embossing station 26 where there is located embossing means in the form of an embossing die set 28 actuated by a actuating member 30. Die set 28 is one of a series of die sets located in a ring on a selector wheel 32. The selector wheel 32 is rotatable about its central axis 33 and comprises an upper 35 and a lower wheel 37. One part of a die set is on the upper wheel 35 and the other is arranged opposite thereto on the other wheel 37. In particular, one of these wheels carries the die and the other of which carries the punch of each die set. In this way, any one of the series of die sets can be located at the embossing station 26 to emboss the selected indicia on the tape 14.

Figure 4:
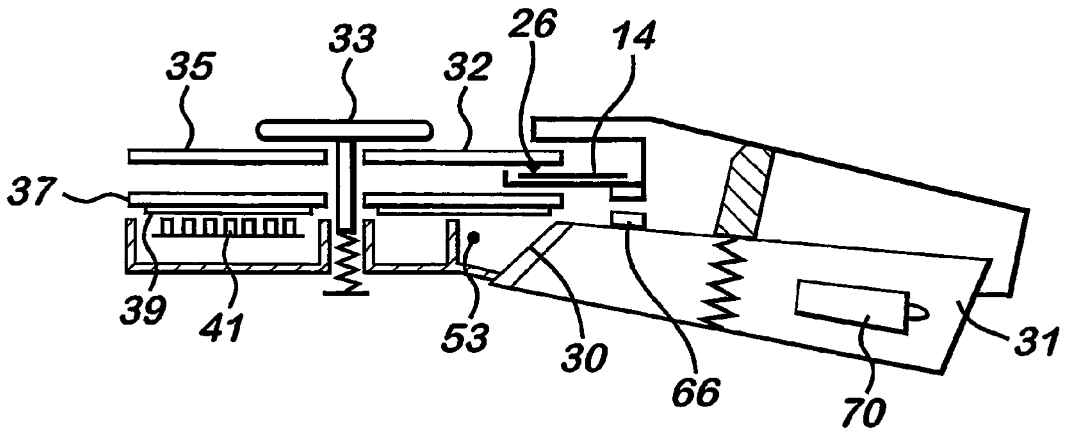
FIG. 4 is schematic view of the embosser of FIG. 1 showing its construction.

As can be seen from FIG. 4, the actuating member 30 is part of the handle 31. When the handle is actuated, it pivots about point 53 causing the actuating member to move upwardly to move the part of the die set of the lower ring toward the upper ring.

Figure 3:
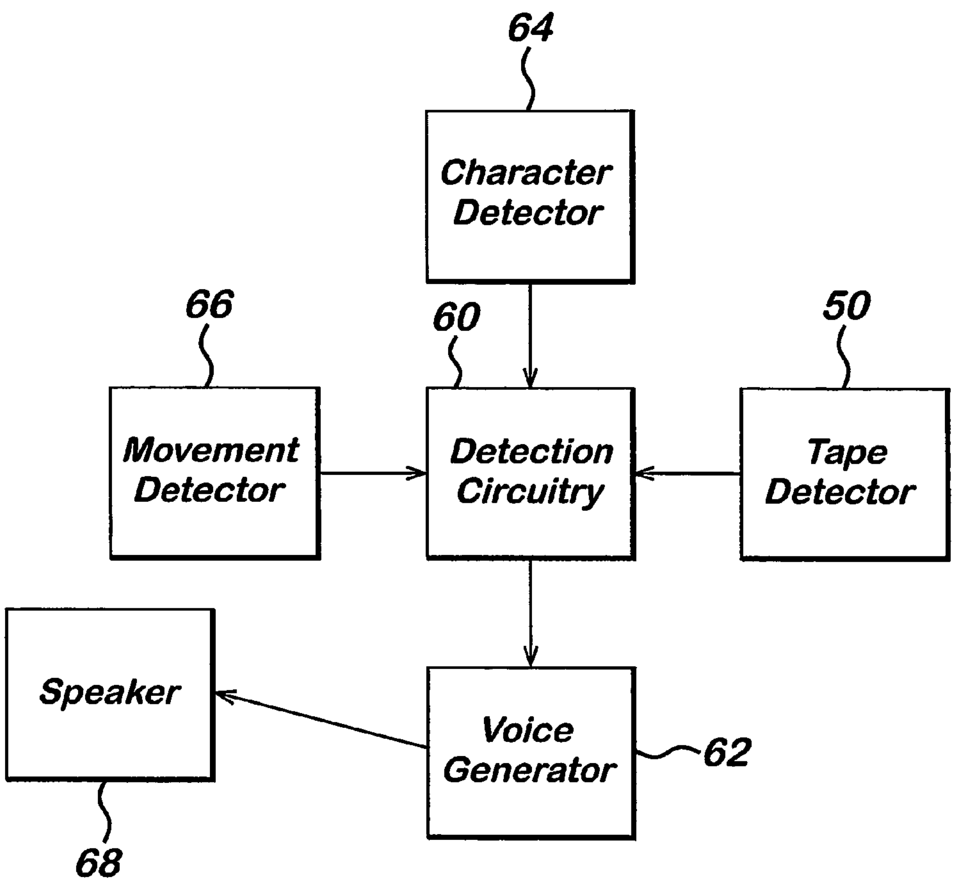
FIG. 3 is a diagrammatic representation of the circuitry of the embosser of FIG. 1.

The handle is additionally arranged to receive batteries 70 which are used to supply the circuitry illustrated in FIG. 3.

Figure 2:
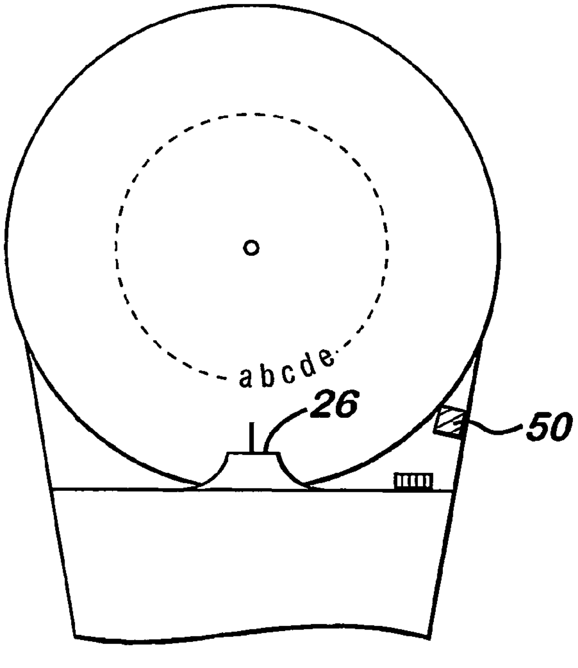
FIG. 2 shows part of the embosser of FIG. 1 in more detail, with no tape present.

Reference is made to FIG. 2 which shows the view from above of the embosser with no tape medium 14 being present. A switch 50 is provided. The switch 50 is a plunger switch. When tape medium is present, the plunger is depressed thus closing a contact. When no tape is present, the switch is open.

Reference is made to FIG. 3 which shows the circuitry for controlling the embosser. The switch 50 is connected to detection circuitry 60 which receives an input therefrom. In particular, the detection circuitry 60 determines whether or not the plunger switch 50 is depressed or not. If the switch is depressed, then the contact will be closed and it can be determined that tape is present. If, on the other hand, the switch is not depressed, the contact is open and the detection circuitry determines that no tape is present. Any other suitable mechanism may alternatively be used.

In preferred embodiments of the present invention, the voice generator 62 is arranged only to operate when the tape is present.

The circuitry comprises a character detector 64 which is arranged to detect which character or the like is at the embossing station. The underside of the wheel is coded with a coding ring 39 having metal strips. Six contacts 41 are provided. Depending on whether or not a contact 41 is in contact with a metal strip depends on whether or not a signal is provided. In this way, the output of the contacts 41 provides a binary output which is unique for each position of the wheel. This binary output is used by the detection circuitry 60 to identify the letter or the like at the embossing station. It should be appreciated that the character detector can be replaced by any other type of detector.

The detection circuitry 60 is arranged to use the information from the character detector 64 to determine which character or symbol has been selected. Also provided is a movement detector 66 which is arranged to determine when the handle has been activated to emboss a character on the tape. This is done by a switch 66. When the handle is in its unactivated position, the switch is open. When the handle is squeezed, the switch is closed. Again any other suitable arrangement may be alternatively used.

The detection circuitry thus provides an output to a voice generator 62 identifying that a character is being embossed, that tape is present and the identity of the character. The voice generator 62 then provides an output to a speaker 68 and the speaker outputs the selected letter or the like. The voice generator may in some embodiments of the invention only provide an output if tape is present. However this is optional. The voice generator preferably only provides an output when the handle is activated and the image is embossed on the tape.

Figure 5:
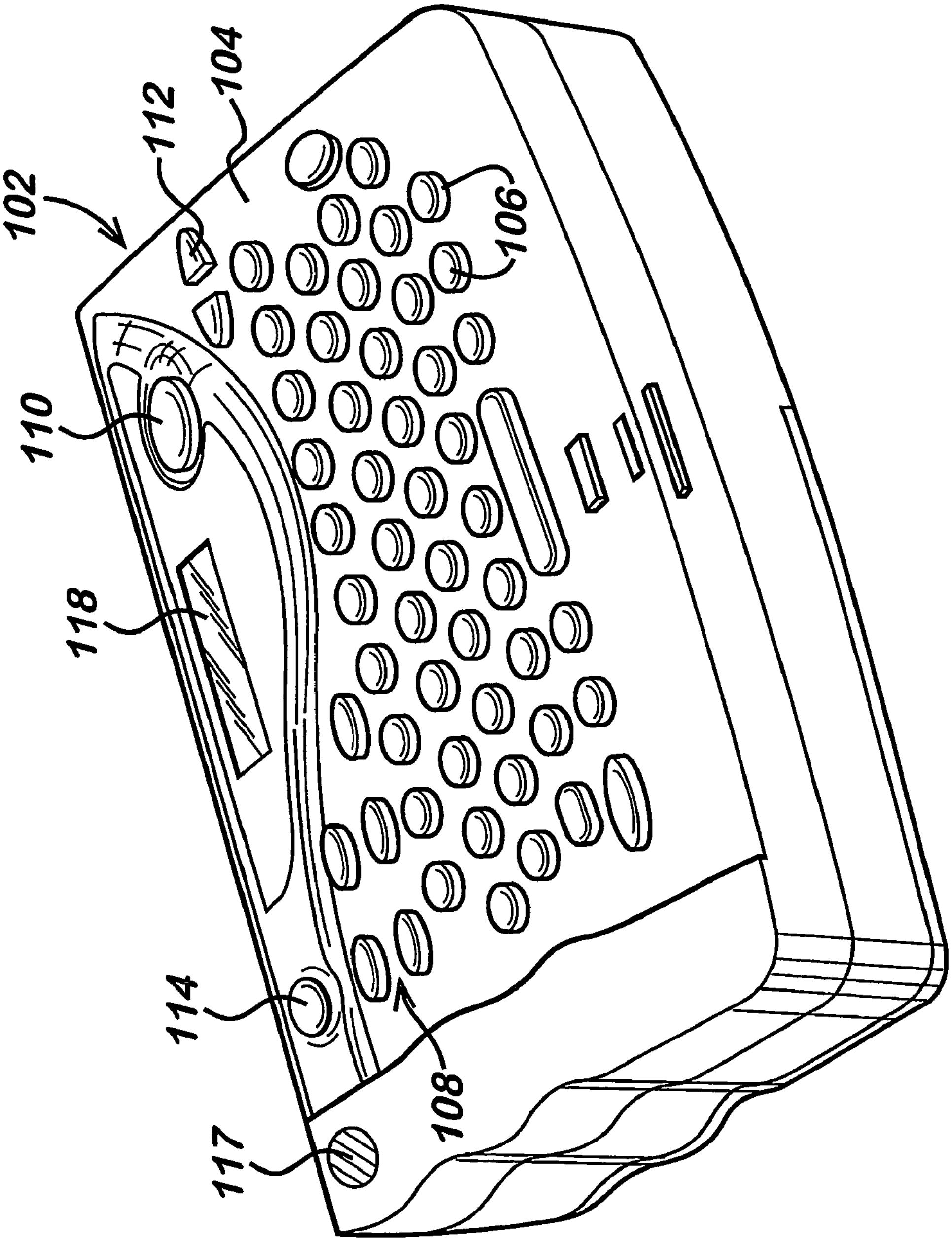
FIG. 5 shows a tape printer embodying the present invention.

FIG. 5 shows a simplified plan view of a tape printing apparatus 102. The tape printing apparatus 102 comprises a keyboard 104. The keyboard 104 has a plurality of data entry keys and in particular comprises a plurality of numbered, lettered and punctuation keys 106 for inputting data to be entered as a label and function keys 108 for editing the input data. The keyboard 104 also comprises a print key 110 which is operated when it is desired that a label be printed as well as tape feeding keys 112. Additionally, the keyboard 104 has an on/off key 114 for switching the tape printing apparatus 102 on and off. The function keys 108 allow the attributes of the label to be altered. For example, the function keys 108 can control the size or font of the input data, underlining, boxing or the like.

The tape printing apparatus 102 also has a liquid crystal display 118 which displays the data as it is entered. The display 118 allows the user to view all or part of the label to be printed which facilitates the editing of the label prior to its printing. Additionally, the display 118 can also display messages to the user, for example, error messages or an indication that the print key 110 should be pressed. The display 118 is driven by a display driver 128 which can be seen in FIG. 7. In certain embodiments of the present invention, the display can be omitted.

Figure 6:
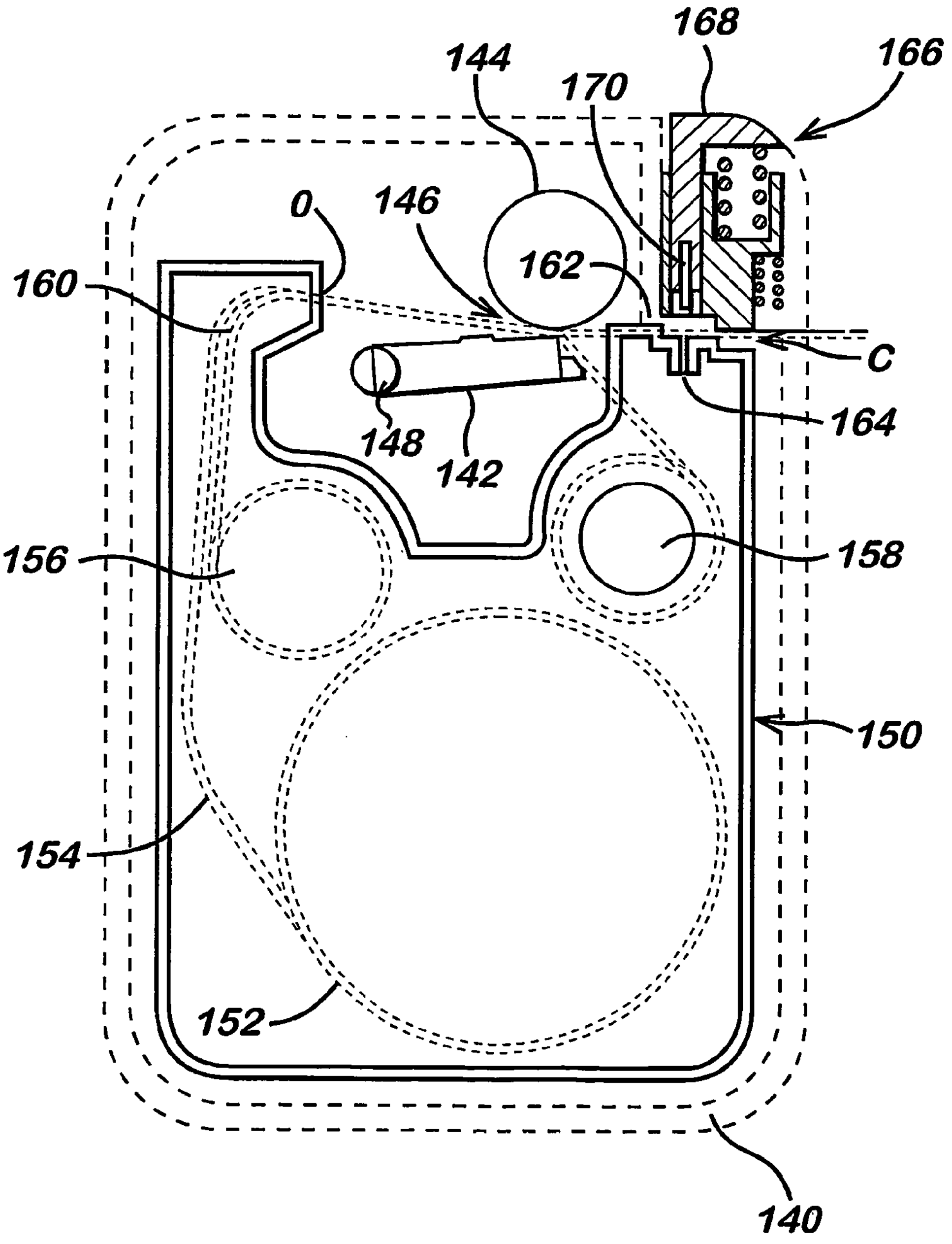
FIG. 6 shows the cassette receiving bay of the tape printer of FIG. 5 with a cassette in place.

On the underside of the tape printing apparatus 102, which can be seen from FIG. 6, there is a cassette receiving bay 140. The cassette receiving bay 140 includes a thermal printhead 142 and a platen 144 which cooperate to define a print zone 146. The printhead 142 is pivotable about a pivot point 148 so that it can be brought into contact with the platen 144 for printing and moved away from the platen 144 to enable a cassette to be removed and replaced. A cassette inserted into the cassette bay 140 is denoted generally by reference numeral 150. The cassette 150 holds a supply spool 152 of image receiving tape 154. The image receiving tape 154 comprises an upper layer for receiving a printed image on one of its surfaces and has its other surface coated with an adhesive layer to which is secured a releasable backing layer. The image receiving tape 154 is guided by a guide mechanism (not shown) through the cassette 150, out of the cassette 150 through an outlet O, past the print zone 146 to a cutting location C. The same cassette 150 also has an ink ribbon supply spool 156 and ink ribbon takeup spool 158. The image receiving tape 154 and ink ribbon 160 are arranged to pass in overlap between the printhead 142 and the platen 144. In particular, the image receiving layer of the image receiving tape 154 is in contact with the ink ribbon 160.

The platen 144 is driven by a motor 130 (see FIG. 7), for example a DC motor or a stepper motor so that it rotates to drive the image receiving tape 154 in a direction which is parallel to the lengthwise extent of the image receiving tape 154 through the print zone 146. In this way, an image is printed on the image receiving tape 154 and the image receiving tape is fed from the print zone 146 to the cutting location C provided at a location on a portion of the wall of the cassette 150 which is close to the print zone 146. The portion of the wall of the cassette 150 where the cutting location C is defined is denoted by reference 162. A slot 164 is defined in the wall portion 162 and the image receiving tape 154 is fed past the print zone 146 to the cutting location C where it is supported by facing wall portions on either side of the slot 164.

A cutting mechanism 166 is provided and includes a cutter support member 168 which carries a blade 170. The blade 170 cuts the image receiving tape 154 and enters the slot 164.

In those embodiments where the motor 130 is a DC motor, the image receiving tape 154 is driven continuously through the print zone 146 during printing. Alternatively in those embodiments where the motor is a stepper motor, the platen 144 rotates stepwise to drive the image receiving tape 154 in steps through the print zone 146 during the printing operation.

The print head 142 is a thermal printhead comprising a column of a plurality of printing elements which are selectively activatable in dependence on the image to be printed. The printhead 142 is preferably only one printing element wide and the column extends in a direction perpendicular to the lengthwise direction of the image receiving tape 154. The height of the column of printing elements is preferably equal to the width of the image receiving tape 154 to be used with the label printing apparatus 102. Where more than one width of image receiving tape 154 is used, the printhead column has a height equal to the largest width of tape 154. An image is printed on the image receiving tape 154 column by column by the printhead 142.

The printhead 142 has a printing cycle having a first part (strobe type) in which the selected printing elements are activated and a second part in which none of the printing elements are activated.

As an alternative to the one cassette system shown in FIG. 6, the cassette receiving bay may be arranged to receive a separate image receiving tape cassette and a separate ink ribbon cassette which are arranged so that the ink ribbon and image receiving tape are passed in overlap through a print zone. This particular cassette arrangement is described for example in our European Patent Application No 578372, the contents of which are herein incorporated by reference. Any other suitable arrangement for providing a supply of image receiving tape can of course be used with embodiments of the present invention.

Figure 7:
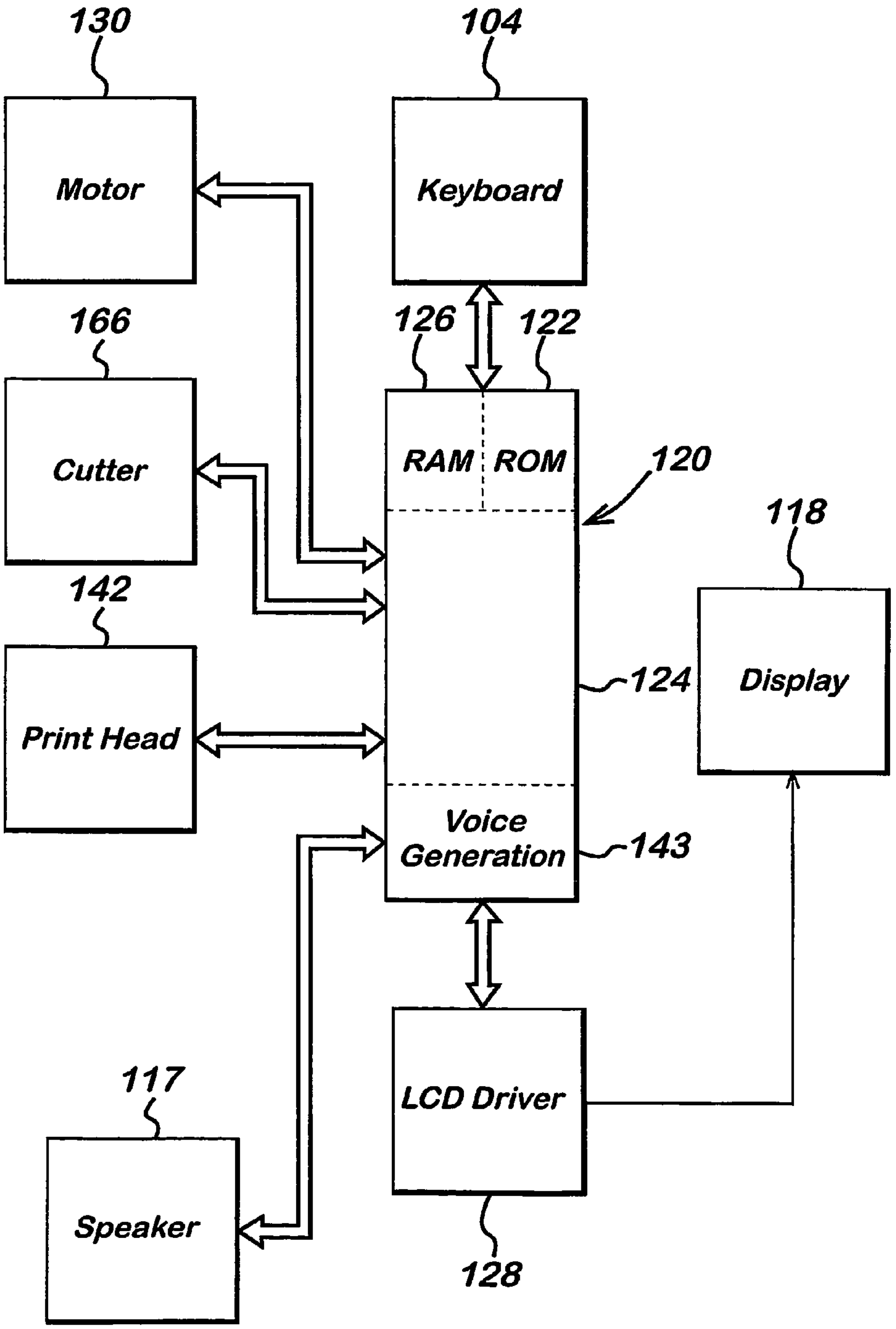
FIG. 7 is a diagrammatic representation of the circuitry of the tape printer of FIG. 5.

FIG. 7 shows the basic control circuitry for controlling the tape printing apparatus of FIGS. 5 and 6 There is a microprocessor chip 120 having a read only memory (ROM) 122, a microprocessor 124 and random access memory capacity indicated diagrammatically by RAM 126. The microprocessor 124 is controlled by programming stored in the ROM 122 and when so controlled acts as a controller. The microprocessor chip 120 is connected to receive label data input to it from the keyboard 104. The microprocessor 120 outputs data to drive the display 118 via the display driver chip 128 to display a label to be printed (or a part thereof) and/or a message or instruction for the user. The display driver chip 128 may be incorporated in the microprocessor chip 120. Additionally, the microprocessor chip 120 also outputs data to drive the printhead 142 which prints an image onto the image receiving tape 154 to form a label. The data output to the printhead 142 defines which of the printing elements are to be activated and the duration of the first part of the printing cycle. Finally, the microprocessor chip 120 also controls the motor 130 for driving the image receiving tape 154 through the tape printing apparatus 102. The microprocessor chip 120 may also control the cutting mechanism 166 to allow lengths of image receiving tape 154 to be cut off after the image has been printed thereon. It should be appreciated that the cutter mechanism can alternatively be manually operated.

It should be appreciated that in alternative embodiments of the present invention, an image can be printed directly onto a thermally sensitive image receiving tape, thus avoiding the need for an ink ribbon.

The microprocessor 124 comprises a voice generation processor 143. The voice generation processor may be part of the microprocessor 124 or may be provided by a separate processor. If the voice generation processor 143 is provided by a separate processor, that may be provided on a different integrated circuit to the microprocessor 124. The voice generation processor 143 is arranged to receive information from the keyboard 104, via the microprocessor 124 in preferred embodiments of the present invention, identifying the key which has been pressed. The microprocessor 124 may be arranged to receive the information from the keyboard 104 and identify the key which has been pressed.

For those keys associated with characters or letters, the associated letter or character is identified. Information identifying the character or number is output to the voice generation processor 143 which outputs a signal to a speaker 117. The speaker 117 thus outputs the letter or number which has been activated by the user. Thus, if the user presses a key for the letter "K" the speaker will broadcast the sound of the letter "K".

Additionally or alternatively, the functions selected using the keys 108 may be also output by the speaker 117. For example, the speaker 117 may say that there is a "box" when boxing is selected, indicate the font, size of font or the like.

Symbols of the like may be selected by the keyboard and again be aurally output by the speaker 117 when selected. In some embodiments of the present invention, the symbol is selected from a symbol table. When a symbol is selected, a number of different symbols are displayed and the user is able to select a symbol using cursor keys. The selected symbol is then output by the speaker 117.

Activation of a punctuation key, the space key, the print key or the tape feed key again may result in the speaker providing an aural indication as to the key which has been activated by the user.

Additionally or alternatively, the voice generation processor 143 may indicate the content of a label when for example the print key is activated. If the image consists of text and the text contains recongnisable words, then the voice generation processor 143 may recogise those words and recite them. For characters that it does not recongnise as words, it can simply spell out the input characters.

The voice generation processor may only be activated when the print key is activated or may be activated each time one of the keys is activated.

The voice generation processor may only be activated if tape is present. In this case, a switch or the like is provided for identifying if a cassette is present.

The invention claimed is:

1. A tape printer for applying an image onto a tape medium, said tape printer comprising:

input means for allowing a user to select an image to be applied to a tape medium;

means for applying said image to said tape medium;

means for determining whether the tape medium is present;

means for obtaining input image information from said input means; and sound generation means for using said input image information to generate an audible output associated with said image selected, only when the means for determining whether the tape is present determines that the tape is present.

2. A tape printer adapted to apply an image onto a tape comprising:

a selector adapted to allow a user to select an image to be applied to a tape;

an image applier adapted to apply the image onto the tape;

a determiner to determine the presence of the tape;

a detector configured to obtain selected image information from said selector; and a sound generator adapted to use said information to generate an audible output associated with said image selected, only when the determiner determines that the tape is present.

3. A tape printer as claimed in claim 2, wherein said sound generator comprises a speaker.

4. The tape printer of claim 2, wherein said sound generator comprises a voice generator.

5. The tape printer of claim 2, further comprising a print key which, when operated, causes the image applier to apply the image onto the tape, and wherein said sound generator is arranged to generate the audible output when said print key is operated.

6. The tape printer of claim 2, wherein said sound generator is arranged to generate the audible output only after said selector has been operated a plurality of times to select a plurality of characters that together spell a word; and wherein said audible output comprises an output representative of the word.

7. The tape printer of claim 2, wherein said image comprises one or more characters, numerals, symbols, or combinations thereof.

8. The tape printer as claimed in claim 7, wherein said sound generator is arranged to generate voice output for said characters, numerals and/or symbols.

9. The tape printer of claim 2, wherein said selector comprises a keyboard.

10. A tape printer as claimed in claim 6, wherein said sound generator is arranged to generate the audible output only after said selector has been operated plural times to select plural characters that together spell a word;

wherein said audible output comprises plural outputs representative of each respective character of the word.

11. A method for applying an image to a tape, said method comprising:

operating a selector to select an image to be applied to a tape;

determining the presence of the tape;

operating an image applier to apply said image to said tape when the tape is present;

obtaining selected image information from said selector; and using said selected image information to generate, with a sound generator, an audible output associated with said image selected, only when it is determined that the tape is present.

* * * * *

UNITED STATES PATENT AND TRADEMARK OFFICE

CERTIFICATE OF CORRECTION

PATENT NO. : 7,679,788 B2
APPLICATION NO. : 10/487920
DATED : March 16, 2010
INVENTOR(S) : Barry Mak et al.

It is certified that error appears in the above-identified patent and that said Letters Patent is hereby corrected as shown below:

On the Title Page
Item (73) Assignee

Line 1 Please delete “Dymo, N.V.” and replace with --DYMO--.

Signed and Sealed this

Seventh Day of September, 2010

David J. Kappos

David J. Kappos
*Director of the United States Patent and Trademark Office*